United States Patent [19]

Tobias et al.

[11] Patent Number: 5,265,237
[45] Date of Patent: Nov. 23, 1993

[54] BYTE SWAPPING APPARATUS FOR SELECTIVELY REORDERING BYTES OF AN N-BIT WORD COMMUNICATED BETWEEN AN AT COMPUTER AND VME BUS

[75] Inventors: Michael R. Tobias, Clinton; Anthony J. Maresh, Brighton, both of Mich.

[73] Assignee: Xycom, Inc., Saline, Mich.

[21] Appl. No.: 500,786

[22] Filed: Mar. 28, 1990

Related U.S. Application Data

[63] Continuation-in-part of Ser. No. 281,261, Dec. 7, 1988, abandoned.

[51] Int. Cl.⁵ .................. G06F 7/00; G06F 13/38; G06F 13/00
[52] U.S. Cl. .................. 395/500; 395/800; 364/927.92; 364/927.93; 364/926.3; 364/939.2; 364/DIG. 2; 364/239.3; 364/260.9
[58] Field of Search .................. 395/500, 775, 800

[56] References Cited

U.S. PATENT DOCUMENTS

| | | | |
|---|---|---|---|
| 4,495,598 | 1/1985 | Vahlstrom et al. | 395/775 |
| 4,931,925 | 6/1990 | Utsumi et al. | 395/775 |
| 4,956,809 | 9/1990 | George et al. | 395/600 |
| 4,959,779 | 9/1990 | Weber et al. | 395/775 |
| 4,999,808 | 3/1991 | Blahut et al. | 395/775 |
| 5,107,415 | 4/1992 | Sato et al. | 395/800 |
| 5,132,898 | 7/1992 | Sakamura et al. | 395/425 |

OTHER PUBLICATIONS

Black, John, "A Few Words from the Editor Byte Ordering Problems: Don't Let Them Catch You by Surprise", VMEbus Systems, Mar.-Apr. 1987, pp. 31-36.
Morrisey, Shawn "Byte Numbering Differences: VMEbus and the CPU-386", Force Computers, Inc., Technical Note, TN-001, Jan. 16, 1987.

Primary Examiner—Robert B. Harrell
Assistant Examiner—Paul Harrity
Attorney, Agent, or Firm—Harness, Dickey & Pierce

[57] ABSTRACT

A byte swapping circuit which selectively orders the bytes of a 16 or 32 bit word to enable proper transmission of data between an AT computer and a VMEbus. The byte swapping circuit generally includes first, second, third and fourth groups of buffers which are disposed in parallel along an internal bus of the circuit. The first group of buffers swaps the bytes of a word having bytes A, B, C and D into the order D, C, B and A. The second group of buffers transmits a word having bytes A, B, C and D in the same order without any byte swapping. The third group of buffers swaps the bytes A and B of a 16 bit word into the order B, A. The fourth group of buffers shifts the C and D bytes of a 32 bit word, which would normally occupy bit positions 16-31, into bit positions 0-15. A control register selectively enables one group of buffers at a time to effect the needed byte swapping.

4 Claims, 8 Drawing Sheets

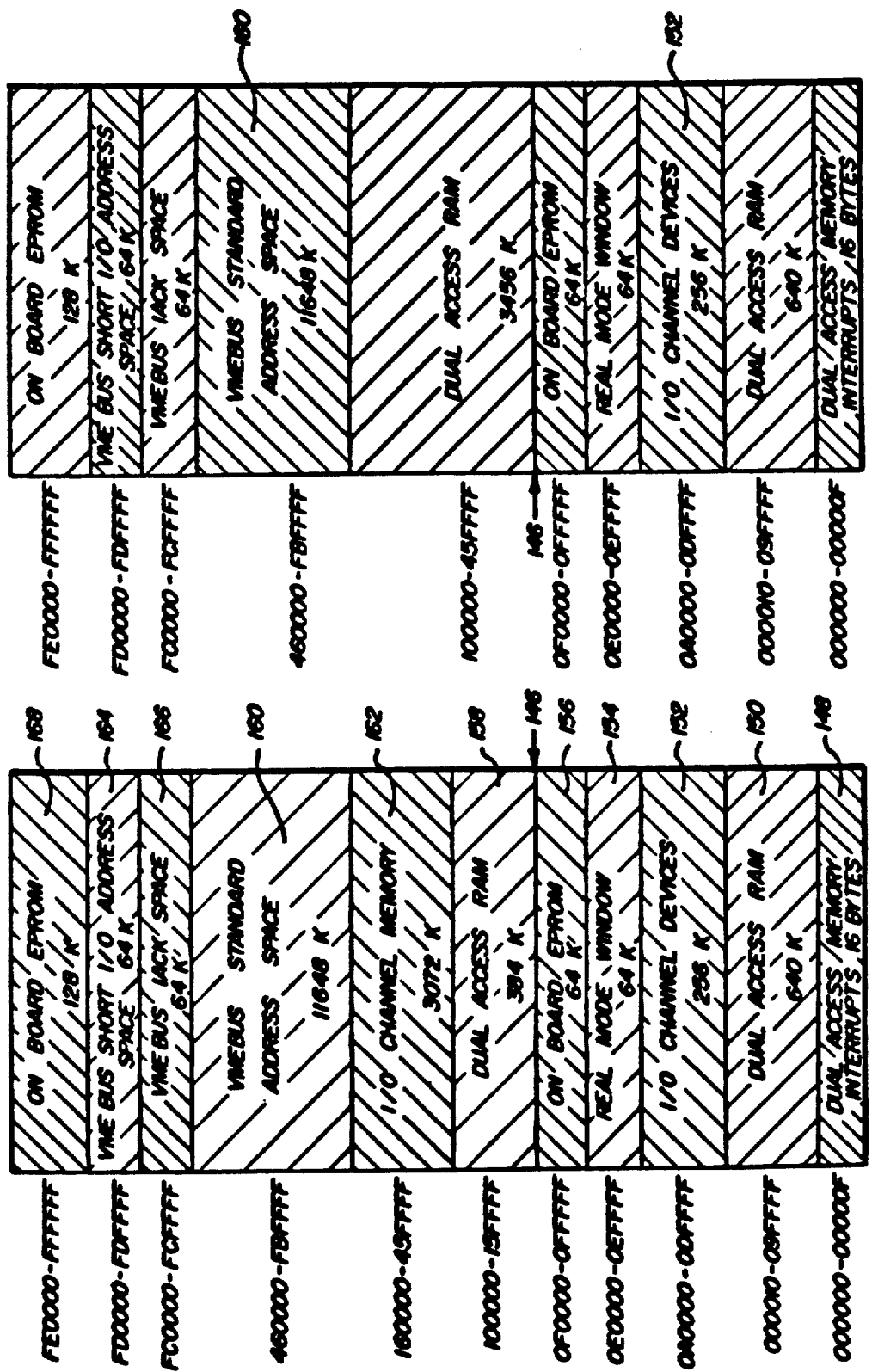

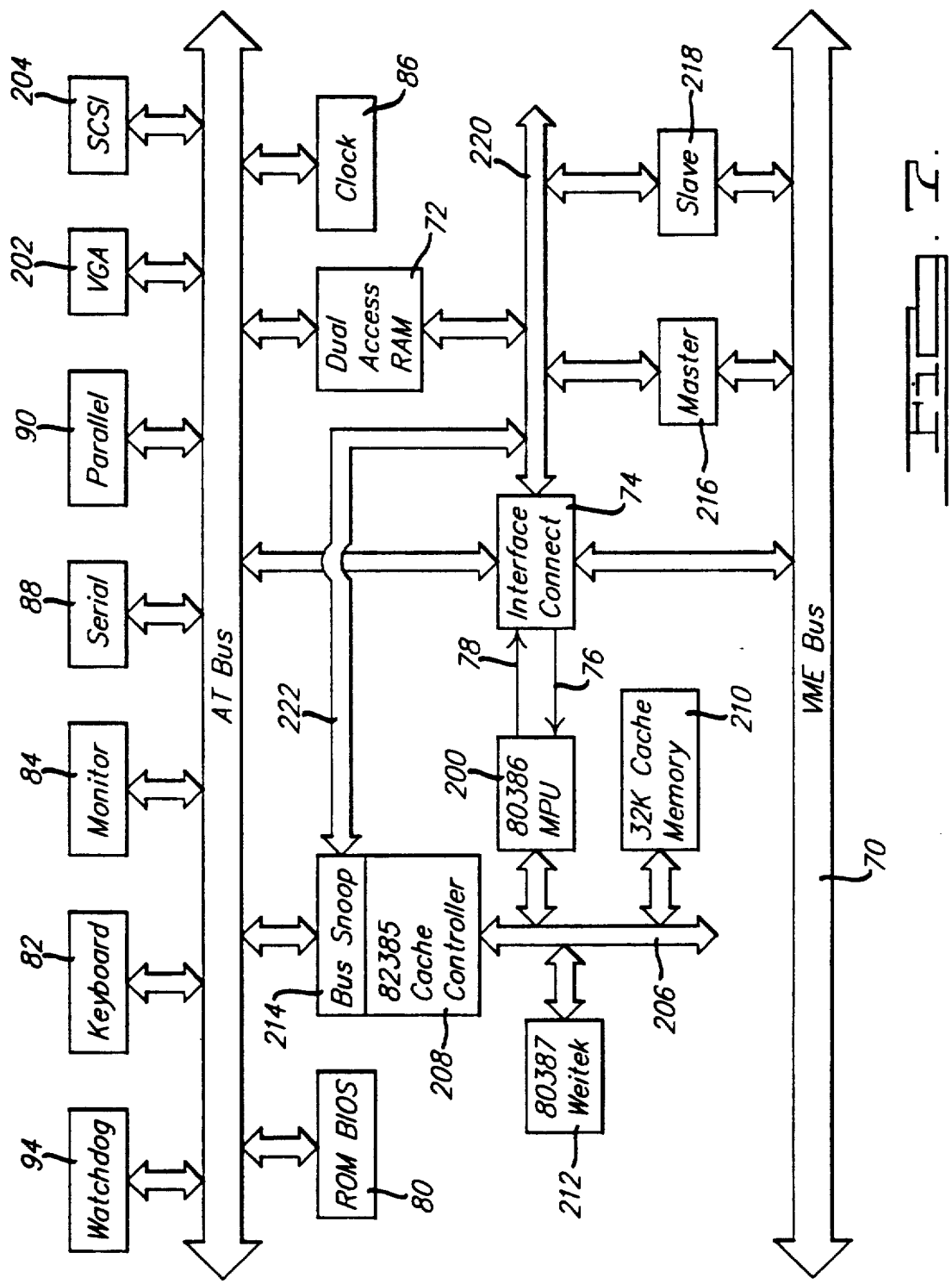

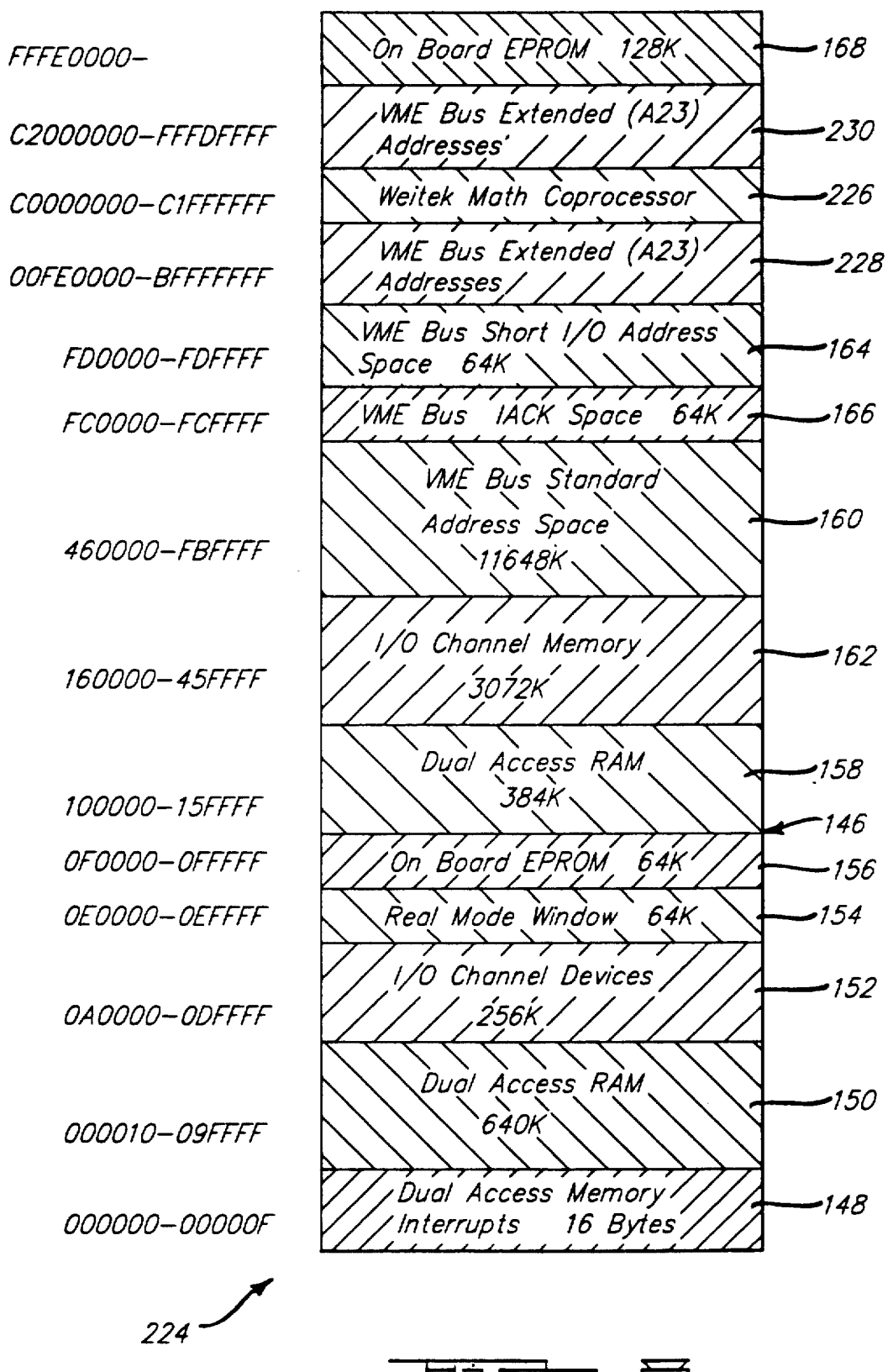

BYTE SWAPPING APPARATUS FOR SELECTIVELY REORDERING BYTES OF AN N-BIT WORD COMMUNICATED BETWEEN AN AT COMPUTER AND VME BUS

CROSS-REFERENCE TO RELATED APPLICATION

This application is a continuation-in-part of U.S. patent application Ser. No. 281,261 filed Dec. 7, 1988, now abandoned.

BACKGROUND AND SUMMARY OF THE INVENTION

The present invention relates generally to computer bus architecture. More particularly, the invention relates to circuitry for interconnecting VMEbus and IBM PC/XT and AT bus architectures.

The VMEbus is a standard bus architecture which has become popular in automated manufacturing and processing environments. The VMEbus specification is defined in "VMEbus Specification Manual," Revision c.1, VMEbus International Trade Association, published by Printex Publishing, Inc., which is incorporated herein by reference.

The IBM PC/XT and the IBM AT bus architecture has become a popular industry standard in office automation, database management and in the display of graphical information. The IBM PC/XT architecture is described in IBM Technical Reference for the PC/XT, available from International Business Machines and the IBM AT architecture is described in IBM Technical Reference for the AT, available from International Business Machines both references are incorporated herein by reference. The IBM AT bus architecture may be considered as a superset of the IBM PC/XT architecture. The IBM AT bus architecture retains compatibility with IBM PC/XT architecture, adding additional features and capabilities. For convenience, unless otherwise designated, the term IBM AT architecture will be used to refer to both the IBM PC/XT architecture and the IBM AT architecture.

The VMEbus and the AT bus architectures each have their own strengths and weaknesses and there are numerous applications where it would be advantageous to utilize both architectures together to take advantage of collective strengths and minimize the weaknesses. For example, a manufacturing installation might use a VMEbus-based computer system to control manufacturing equipment in the harsh manufacturing environment. VMEbus computer systems are ideally suited for such applications. However, VMEbus computer systems do not enjoy the wealth of user-friendly database management, spreadsheet and visual display software available for IBM AT bus systems. The VMEbus-based manufacturing installation, without access to IBM AT software, would require extensive programming in order to duplicate the database, spreadsheet and visual display functions.

As another example, consider a scientific data analysis installation in which IBM AT bus-based computer systems collect real time data and process that data using a sophisticated statistical processing software package. Although well-suited at running sophisticated statistical processing software, the AT bus architecture is not as well suited at data collection, particularly in harsh environments.

An additional problem in uniting the VMEbus and AT bus architectures is the manner in which the processor of an AT system and the processor of a VMEbus device store information. The AT systems are based on an Intel processor which stores the most significant byte of a word or longword at the highest memory address and the least significant byte at the lowest memory address. VMEbus systems, however, incorporate a Motorola processor which stores the bytes of a word or longword in the opposite fashion: the most significant byte is stored at the lowest memory address and the least significant byte at the highest memory address. Accordingly, when data is passed between the Intel processor of an AT system and a Motorola processor of a VMEbus device, the bytes of the word being transferred must be reordered, or "swapped", for proper communication to occur.

The above discussion demonstrates the need for combining and uniting the VMEbus and AT bus architectures, to allow the user access to both the rugged and powerful VMEbus and the rich software environment of the IBM AT. The present invention provides such a solution in the form of an interface system between the VMEbus and the AT bus. In the preferred embodiments, the invention is implemented on a first circuit board which is configured to plug into the standard VME backplane thereby communicating with the VMEbus architecture. The first circuit board also implements a fully functional AT bus, complete with central processing unit and random access memory. A second circuit board, attachable to the first circuit board, and also adapted for attaching to the VMEbus backplane interfaces with the AT bus and provides additional AT computer functions such as input/output with disk drives and video displays.

The circuit of the invention allows the on-board central processing unit to act both as a fully functional master and slave on the VMEbus. The on-board random access memory is dual access and can be addressed by either the VMEbus as VMEbus memory or by the on-board central processing unit of the AT system as AT bus memory.

When the on-board central processing unit (an Intel 80286 or 80386 processor) is in the real mode, the on-board central processing unit communicates with the VMEbus through a programmable window which can be user-selected to address several different VMEbus addressing modes. When the central processing unit is in the protected mode, the central processing unit addresses the VMEbus by addressing portions of the on-board random access memory which maps directly into the VMEbus address space.

In addition to implementing a fully functional AT computer with fully functional AT bus, the invention provides additional features not found on a conventional AT computer, including additional maskable and nonmaskable interrupts, a watchdog timer circuit, a cache memory and cache controller, a bus snoop for detecting accesses to the dual access RAM, software abort and reset capability, as well as full access to the VMEbus and all VMEbus interrupt signals. Inherent incompatibilities between the Intel central processing unit architecture (IBM AT) and the Motorola architecture (VMEbus) are overcome by a mapping technique wherein certain read and/or write cycles of certain predefined memory locations are interpreted by the hardware as constituting signals or functions not commonly provided in both architectures.

To overcome the byte ordering problems encountered when passing data between the Intel processor of the AT computer and the Motorola processor of a VMEbus device, a byte "swapping" circuit is provided. The circuit generally includes a plurality of independent groups of buffers which are operable to selectively reorder the bytes of a word or longword to enable proper communication between the Intel and Motorola processors. The byte swapping circuit of the present invention is further operable to enable the bytes of a word or longword to be transmitted between the Intel processor of the present invention and a Motorola-based processor device operating on the VMEbus. In this manner, the bytes of a word or longword may be appropriately reordered when necessary (i.e., when passing data between an Intel and a Motorola processor), as well as transmitted between an AT bus and a VMEbus without being altered.

For a more complete understanding of the invention, its objects and advantages, reference may be had to the following specification and to the accompanying drawings.

BRIEF DESCRIPTION OF THE DRAWINGS

FIG. 5 is a memory map of a 1 megabyte embodiment of the invention as seen by the CPU of the interface processor;

FIG. 6 is a memory map of a 4 megabyte embodiment of the invention as seen by the CPU of the interface processor of the invention;

FIG. 7 is a simplified block diagram of an alternative preferred embodiment of the present invention;

FIG. 8 is a memory map of a 1 megabyte embodiment of an alternative preferred embodiment of the present invention as seen by the 80386 microprocessor;

DESCRIPTION OF THE PREFERRED EMBODIMENTS

Figure 1:
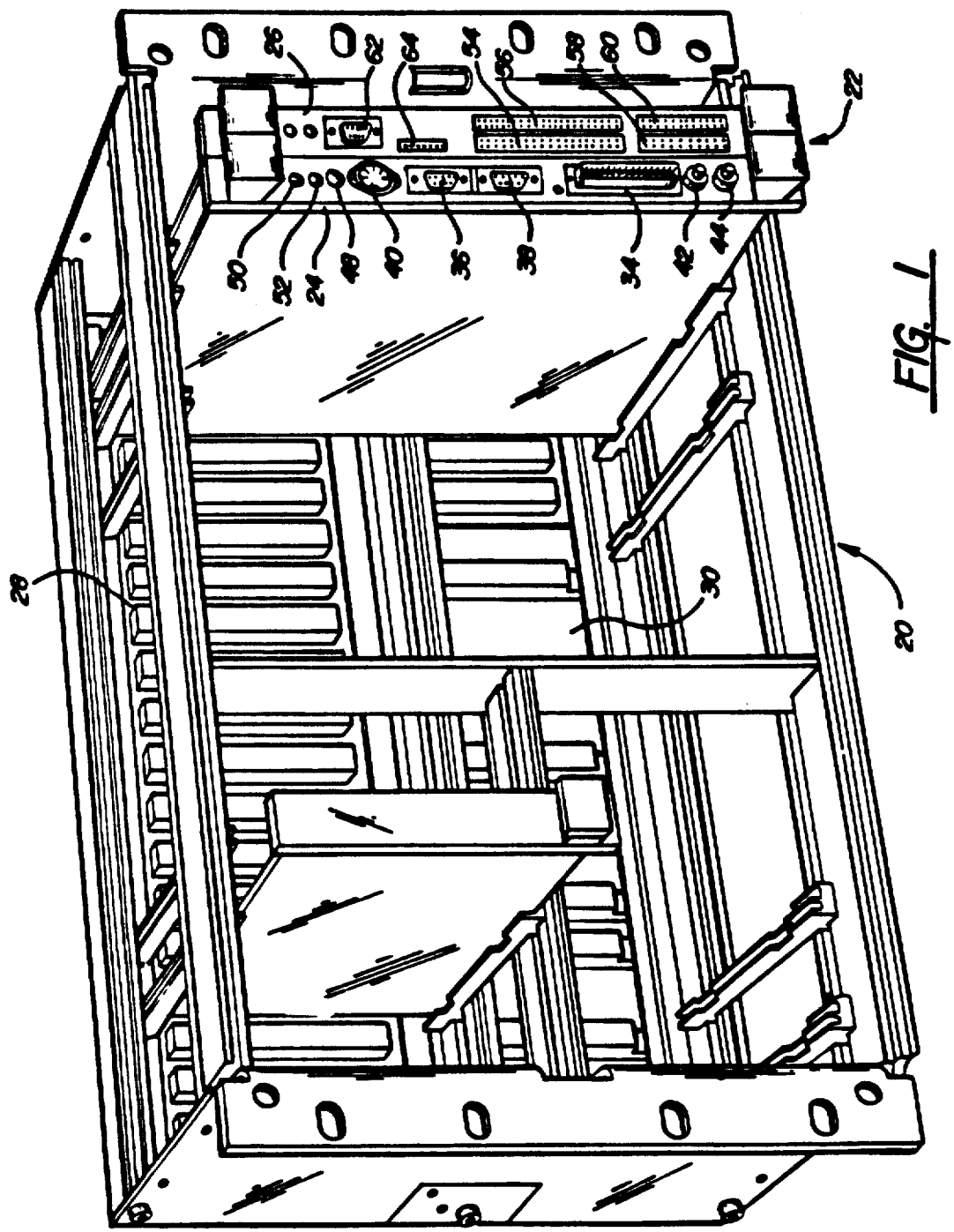
FIG. 1 illustrates a VMEbus subrack with the interface processor boards of the invention installed.
Figure 2:
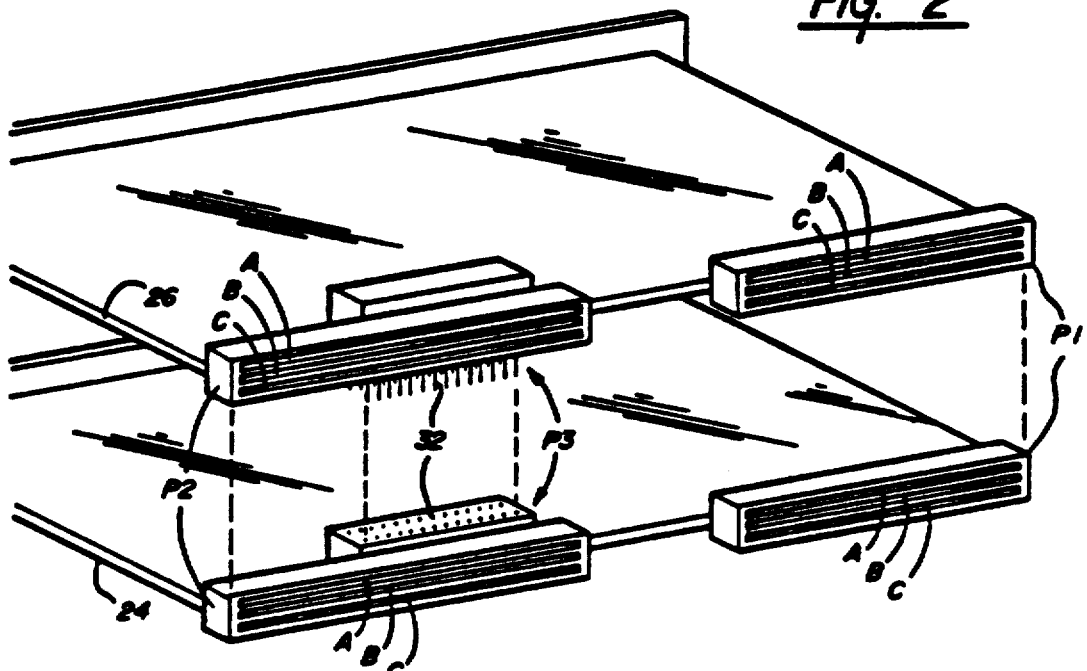
FIG. 2 is a perspective view of the interface processor boards of the presently preferred embodiment comprising separate and detachable CPU card and input/output card, illustrating the J3/P3 interconnection jack.

The present invention is adapted for plug compatibility with the VMEbus architecture. FIG. 1 illustrates a typical VMEbus subrack 20 into which the interface processor boards of the invention are installed as at 22. The presently preferred embodiments of the invention are implemented on two separate attachable and detachable cards, a CPU card 24 and an input/output card 26. Both cards are adapted to plug into the J1 backplane 28 and J2 backplane 30. As seen in FIG. 2, cards 24 and 26 connect to one another through a laterally extending plug and jack connector 32, also designated as plug P3 and jack J3 connectors.

Although other arrangements are possible, a first preferred embodiment of the invention will now be discussed. In the first preferred embodiment CPU card 24 includes an 80286 Intel microprocessor, dual access random access memory, an optional 80287 math co-processor, a full IBM AT mother board architecture with fully functional AT bus and three software configurable ports (two serial ports and one parallel port). In addition, the CPU card 24 includes the VMEbus master, slave and interrupt handler interfaces. In addition to standard IBM AT mother board features, the CPU card also includes a watchdog timer circuit, control/status registers as well as software abort and reset capabilities. The IBM AT is accessible on either the VMEbus P2 connector or on the optional P3 connector.

Input/output card 26 provides the interface between the CPU card and floppy disk, hard disk and graphics controllers. Input/output card 26 includes EGA, CGA, MDA and Hercules graphics support, including 256 K bytes of video RAM. The input/output card further includes an IBM PC/AT-compatible Winchester and floppy disk controller which can control up to two Winchester hard disk drives (ST506/ST412, 16 read/write heads each addressing 2,048 cylinders). The floppy disk drive controller can control up to two floppy disk drives (double-sided, double-density, quad-density and quad-high density).

With reference to FIG. 1, the front panel of CPU card 24 includes a Centronics-compatible DB-25 parallel port jack 34 and two DB-9 serial port jacks 36 and 38 to which peripheral devices and printers may be attached. Keyboard jack 40 is provided for attachment of an IBM AT-compatible keyboard. Front panel abort and reset push buttons 42 and 44 are also provided as illustrated. Depressing the abort button causes a non-maskable interrupt (NMI) to be sent to the microprocessor which would then execute the designated interrupt routine (typically one written by the user). Depressing the reset button electrically resets the entire system causing a cold boot reset of the full system. A speaker jack 48 is provided for attaching a system speaker. Light-emitting diodes 50 and 52 indicate whether power-on self-test diagnostic routines have passed or failed. This is useful, since the invention may be used with remotely located monitor, hence the pass/fail indicators are useful in determining at a glance whether diagnostics have failed.

Input/output card 26 also has a front panel which provides jacks 56, 58 and 60 to which hard disk drives may be attached. Floppy diskette drives are similarly attached to jack 54. Plug 62 is provided for attachment of a video monitor. If desired, a light pen can be attached to plug 64.

In order to ensure maximum flexibility and compatibility with the VMEbus structure, all P1 connector terminals are assigned the standard VMEbus signals. With reference to FIG. 2, rows A and C of the P2 connector, which are defined by the VMEbus standard as user-configurable, have been assigned the XT bus signals (i.e., the bus signals which are common to both XT and AT architectures). The VMEbus specification reserves row B of the P2 connector for 32 bit architectures. To accommodate a 32 bit architecture the invention offers the option of either assigning the AT bus signals (i.e., the AT bus signals not found on the XT architecture) to row B of the P2 connector (when 32 bit architecture is not desired) or to the P3 connector (when 32 bit VMEbus architecture is desired). See Table I and FIG. 2 for a further detailed explanation of the signal assignments.

TABLE I

PIN ASSIGNMENTS

J1/P1

| Pin Number | Row a | Row b | Row c |
|---|---|---|---|
| 1 | D00 | BBSY* | D08 |
| 2 | D01 | BCLR* | D09 |
| 3 | D02 | ACFAIL* | D10 |
| 4 | D03 | BG0IN* | D11 |
| 5 | D04 | BG0OUT* | D12 |
| 6 | D05 | BG1IN* | D13 |
| 7 | D06 | BG1OUT* | D14 |
| 8 | D07 | BG2IN* | D15 |
| 9 | GND | BG2OUT* | GND |
| 10 | SYSCLK | G3IN* | SYSFAIL* |
| 11 | GND | BG3OUT* | BERR* |
| 12 | DS1* | BR0* | SYSRESET* |
| 13 | DS0 | BR1* | LWORD* |
| 14 | WRITE* | BR2* | AM5 |
| 15 | GND | BR3* | A23 |
| 16 | DTACK* | AM0 | A22 |
| 17 | GND | AM1 | A21 |
| 18 | AS* | AM2 | A20 |
| 19 | GND | AM3 | A19 |
| 20 | IACK* | GND | A18 |
| 21 | IACKIN* | SERCLK(1) | A17 |
| 22 | IACKOUT* | SERDAT*(1) | A16 |
| 23 | AM4 | GND | A15 |
| 24 | A07 | IRQ7* | A14 |
| 25 | A06 | IRQ6* | A13 |
| 26 | A05 | IRQ5* | A12 |
| 27 | A04 | IRQ4* | A11 |
| 28 | A03 | IRQ3* | A10 |
| 29 | A02 | IRQ2* | A09 |
| 30 | A01 | IRQ1* | A08 |
| 31 | −12V | +5VSTDBY | +12V |
| 32 | +5V | +5V | +5V |

J2/P2

| Pin Number | Row a | Row b (32 bit VMEbus) | Row b (16 bit VMEbus) | Row c |
|---|---|---|---|---|
| 1 | I/O CHCK | +5V | +5V | N.C. |
| 2 | SD7 | GND | GND | IRQ9 |
| 3 | SD6 | RESERVED | MEMW* | DRQ2 |
| 4 | SD5 | A24 | SD8 | N.C. |
| 5 | SD4 | A25 | SD9 | SMEMW* |
| 6 | SD3 | A26 | SD10 | SMEMR* |
| 7 | SD2 | A27 | SD11 | IOW* |
| 8 | SD1 | A28 | SD12 | IOR* |
| 9 | SD0 | A29 | SD13 | DACK3* |
| 10 | IOCHRDY | A30 | SD14 | DRQ3 |
| 11 | AEN | A31 | SD15 | DACK1* |
| 12 | SA19 | GND | GND | DRQ1 |
| 13 | SA18 | +5V | +5V | REFRESH* |
| 14 | SA17 | D16 | MEMCS16* | CLK |
| 15 | SA16 | D17 | IOCS16* | IRQ7 |
| 16 | SA15 | D18 | IRQ10 | IRQ6 |
| 17 | SA14 | D19 | IRQ11 | IRQ5 |
| 18 | SA13 | D20 | IRQ12 | IRQ4 |
| 19 | SA12 | D21 | IRQ15 | IRQ3 |
| 20 | SA11 | D22 | IRQ14 | DACK2* |
| 21 | SA10 | D23 | DACK0* | T/C |
| 22 | SA9 | GND | GND | BALE |
| 23 | SA8 | D24 | DRQ0 | OSC |
| 24 | SA7 | D25 | DACK5* | SBHE |
| 25 | SA6 | D26 | DRQ5 | LA23 |
| 26 | SA5 | D27 | DACK6* | LA22 |
| 27 | SA4 | D28 | DRQ6 | LA21 |
| 28 | SA3 | D29 | DACK7* | LA20 |
| 29 | SA2 | D30 | DRQ7 | LA19 |
| 30 | SA1 | D31 | MASTER* | LA18 |
| 31 | SA0 | GND | GND | LA17 |
| 32 | GND | +5V | +5V | MEMR* |

J3/P3

| Pin Number | Row a (32 bit VMEbus) | Row b (32 bit VMEbus) |
|---|---|---|
| 1 | MEMW* | DACK0* |

TABLE I-continued

PIN ASSIGNMENTS

| | | |
|---|---|---|
| 2 | SD8 | DRQ0 |
| 3 | SD9 | DACK5* |
| 4 | SD10 | DRQ5 |
| 5 | SD11 | DACK6* |
| 6 | SD12 | DRQ6 |
| 7 | SD13 | DACK7* |
| 8 | SD14 | DRQ7 |
| 9 | SD15 | MASTER* |
| 10 | MEMCS16* | NO CONNECTION |
| 11 | IOCS16* | NO CONNECTION |
| 12 | IRQ10 | +5V |
| 13 | IRQ11 | +5V |
| 14 | IRQ12 | GND |
| 15 | IRQ15 | GND |
| 16 | IRQ14 | GND |

Figure 3:
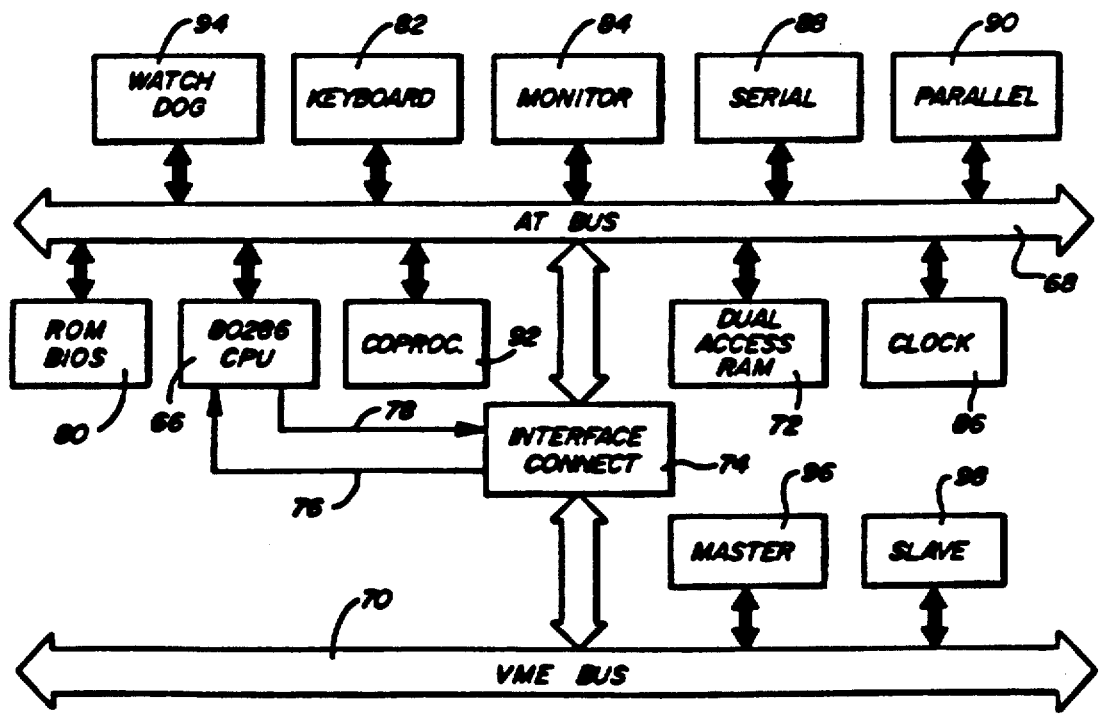
FIG. 3 is a block diagram of the interface processor system of the invention.

Referring now to FIG. 3, the functional elements of the CPU card will be described. The first preferred embodiment uses an Intel 80286 microprocessor. This is a preferred microprocessor, since the IBM AT is based upon the 80286. However, the invention can be implemented using other upwardly compatible microprocessors, such as the Intel 80386 microprocessor, which will be discussed further in the following paragraphs in connection with an alternative preferred embodiment of the present invention.

The Intel 80286 microprocessor can be operated in a first memory addressing mode, called the "real" mode and a second mode, called the "protected" mode. In the real mode the processor can address 1 megabyte of memory. In the protected mode the processor can address 16 megabytes of memory. The real mode is compatible with earlier 8086 and 8088 microprocessors which had only a 20 bit addressing capability, allowing addressing of $2^{20}$ or 1 megabyte of different memory addresses. The MS DOS operating system which runs on the IBM AT architecture uses the real mode addressing scheme. The IBM OS/2 operating system uses the protected mode addressing scheme. By using an Intel 80286 microprocessor or upwardly compatible equivalent, the invention is able to operate in either the MS DOS or the OS/2 operating system environments.

The Intel 80386 microprocessor offers a third addressing mode, called the "virtual" mode, which permits the processor to address a plurality of 1 megabyte memory spaces, each appearing as a real mode memory space. This microprocessor, which will be discussed further in connection with FIGS. 7-10, may be used to implement more powerful multi-tasking features, such as the ability to run a plurality of standard MS DOS applications concurrently. When standards for such virtual mode operation have been adopted, it is contemplated that the virtual mode addressing features of the 80836 microprocessor may be exploited to enhance the operability of the present invention.

As shown in FIG. 3, the microprocessor on board the CPU card 24 is depicted at 66 and designated as an 80286 CPU. The 80286 bus or AT bus is indicated at 68 while the VMEbus is indicated at 70. It will be understood that the 80286 bus or AT bus and the VMEbus each comprise the requisite individual address, data and control buses defined by the respective standards set forth in the publications cited above.

Attached to the 80286 bus or AT bus is dual access RAM 72, which forms a portion of the circuit by which AT bus 68 and VMEbus 70 communicate with one another. Additional interface circuitry by which the buses communicate is depicted at 74. In addition to connecting directly to the AT bus and VMEbus, the interface circuitry 74 also supplies a HOLD REQUEST signal to microprocessor 66 on line 76 and receives a HOLD GRANT signal from microprocessor 66 on line 78. The details of interface circuitry 74 will be discussed more fully below.

Also attached to the AT bus 68 are a plurality of additional systems and devices which comprise and/or augment the AT-compatible computer on which software for IBM microcomputers can be run under the MS DOS (PC DOS) or OS/2 operating systems. These additional components include ROM BIOS 80, keyboard 82, video monitor 84, real time clock 86, one or more serial and parallel ports 88 and 90, an optional math coprocessor 92 and a watchdog timer circuit 94.

The watchdog timer circuit 94 is not commonly found on IBM AT-compatible computers, but is useful for adapting the invention to harsh industrial environments. The watchdog timer circuit is preprogrammed to expect periodic reset signals from the microprocessor 66. If these signals are not periodically received, it may be assumed that the microprocessor is locked up in a never-ending loop or wait state. In such event, watchdog timer circuit 94 sends a non-maskable interrupt to the microprocessor.

The VMEbus 70 is likewise configured in the usual fashion and may support one or more master devices 96 and slave devices 98. The present invention couples the AT bus and VMEbus, allowing VMEbus masters, such as master 96, to access the dual access RAM 72 and also permits the AT bus microprocessor 66 to access the dual access RAM 72 and also to act as either a master device or a slave device on the VMEbus.

Figure 4:
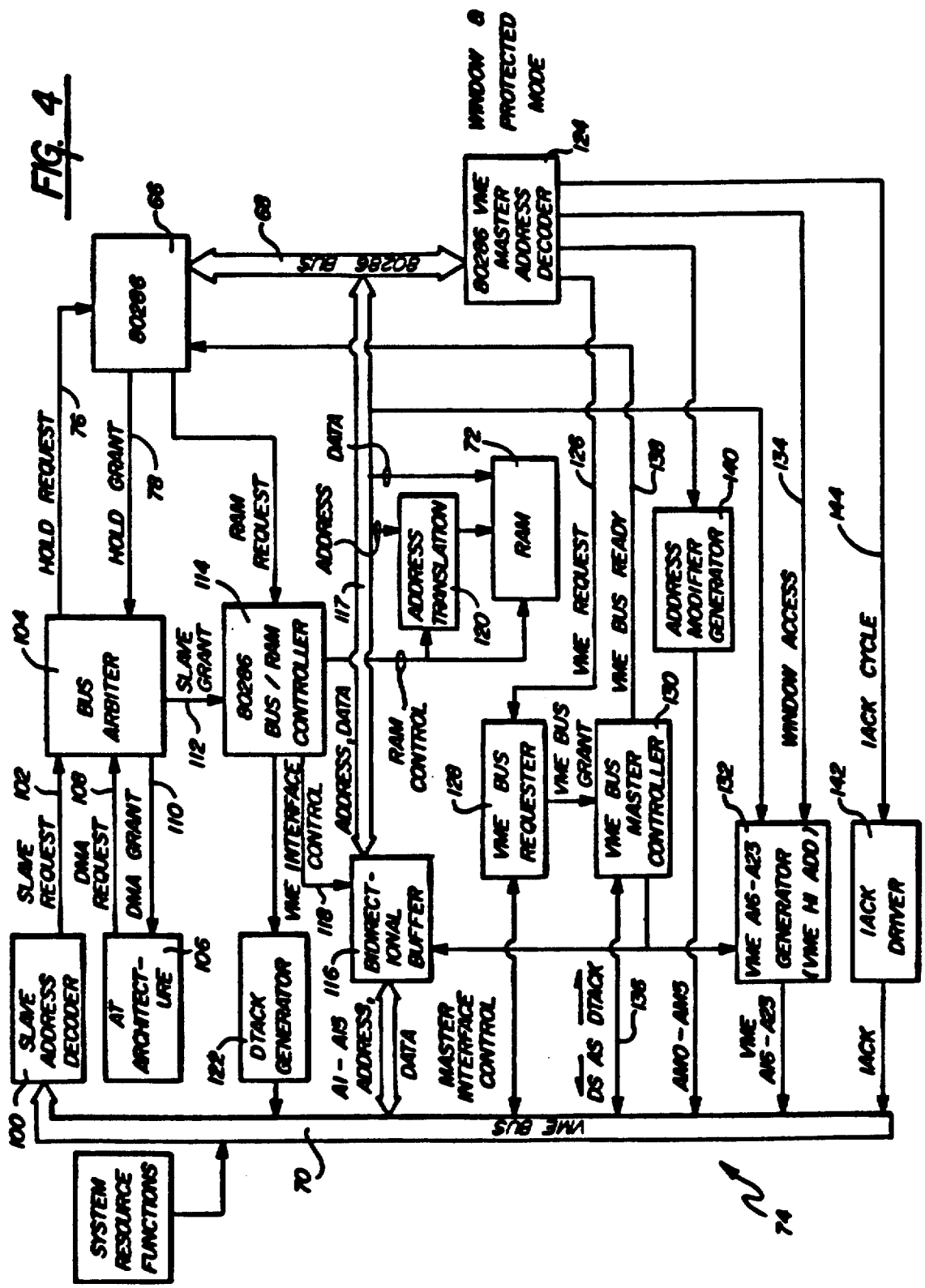
FIG. 4 is a block diagram of the interface circuitry of the invention.

Referring now to FIG. 4, the interface circuitry 74 will be described in greater detail. For reference, FIG. 4 includes microprocessor 66 as well as AT bus 68 and VMEbus 70. The HOLD REQUEST line 76 and HOLD GRANT line 78 (shown in FIG. 3) are also illustrated. The interface circuitry 74 includes a slave address decode circuit 100 which constantly monitors the VMEbus and detects when a master device 96 on the VMEbus wants to address the dual access RAM 72. The slave address decode circuit does this by monitoring the VMEbus, address bus, address modifiers, and data strobes. Circuit 100 thus provides the slave address decoding function required of standard VMEbus slave devices.

When the slave address decode circuit 100 detects a request to access RAM 72, it issues a slave request signal on line 102 which signals a bus arbiter circuit 104, which in turn interfaces the VMEbus slave interface and the AT bus DMA controller with microprocessor 66. The DMA controller is a component of the standard AT architecture illustrated diagrammatically at 106. The DMA controller is used in the usual fashion to move data directly to and from random access memory without CPU intervention. The DMA controller acquires access to the AT bus by issuing a DMA REQUEST signal on line 108 and by receiving a DMA GRANT signal on line 110. In conventional AT architecture the DMA REQUEST signal would be conveyed to microprocessor 66 via line 76 (herein designated the HOLD REQUEST line) and the DMA GRANT signal would be issued from microprocessor 66 via line 78 (herein referred to as the HOLD GRANT line). The bus arbiter circuit 104 is thus interposed between the conventional channel by which the DMA controller signals communicate with microprocessor 66. Bus arbiter circuit 104 links the VMEbus slave interface into the DMA controller scheme, providing an additional SLAVE REQUEST line 102 and an additional SLAVE GRANT line 112 needed to allow the dual access RAM 72 attached to microprocessor 66 to act as a VMEbus slave.

The 80286 bus/RAM controller 114 receives the SLAVE GRANT signal on line 112 and controls both RAM 72 and also bidirectional buffer 116. Bidirectional buffer 116 connects the address and data lines of VMEbus 70 with the address and data lines of AT bus 68. For illustration purposes these address and data lines have been assigned common reference numeral 117. The direction of signal flow through buffer 116 is controlled by the VME slave interface control signal on line 118 from bus/RAM controller 114. When a SLAVE GRANT signal is placed on line 112, the bus/RAM controller 114 switches the bidirectional buffer 116 for signal flow from the VMEbus to the AT bus so that the VMEbus can drive the desired address onto the bus structure defined by buses 117. Bus/RAM controller 114 also provides all the conventional memory timing signals such as RAS and CAS signals needed for memory timing cycles. During VMEbus WRITE cycles, the bidirectional buffer 116 directs data on 117 in toward RAM 72. During VMEbus READ cycles, the bidirectional buffer 116 switches to the opposite direction to direct data on 117 out toward the VMEbus 70. Bus/RAM controller also communicates with address translation hardware 120, which converts or maps the linear, contiguous addresses of the VMEbus into the noncontiguous blocks of the AT bus. DTACK generator 122 provides the DTACK signal for instructing the VMEbus that the RAM 72 access cycle has completed.

With regard to the address translation hardware 120, RAM 72 appears as a contiguous block of memory to the VMEbus 70. For example, in a 1 megabyte embodiment, RAM 72 would appear as one contiguous 1 megabyte block of memory to the VMEbus. To the AT bus 68, however, RAM 72 appears as two separate blocks, a first 640 K block occupying the traditional MS DOS memory space and a second block occupying a portion of the memory space reserved for 80286 protected mode operation (above the 1 megabyte real mode/protected mode boundary).

The amount of memory in this second block will depend on the size of available random access memory 72. For example, if a 1 megabyte embodiment is implemented, the second memory block will be 384 K. If a 4 megabyte embodiment is implemented, the second block will be 3456 K. For an overview of the presently preferred memory mapping of dual access RAM 70, as seen by the AT bus 68, reference may be had to FIGS. 5 and 6, which illustrate a 1 megabyte embodiment and a 4 megabyte embodiment, respectively.

With regard to the DTACK generator 122, there is an interlock on the VMEbus between the data strobes and the DTACK signal. When a slave is addressed on the VMEbus, the requesting master will wait until the slave is ready to respond. The slave so indicates by issuing a data transfer acknowledge signal or DTACK signal. DTACK generator 122 is connected to VMEbus 70 for the purpose of issuing DTACK signals when the circuit of the invention, acting as a slave device, is ready to respond to the VMEbus master. For example, when data is being transferred over bus structure 117 from RAM 72, to the VMEbus 70 through bidirectional buffer 116, the DTACK signal from DTACK generator 122 indicates that the data in buffer 116 is valid and may be read by the VMEbus. Following the READ cycle by the master, the slave request condition may be cancelled.

The above-described portion of interface circuitry 74 allows the dual access RAM 72 attached to microprocessor 66 to serve as a slave device on the VMEbus 70. Data communication is through the dual access RAM memory 72. A more complete overview of the shared dual access memory scheme will be discussed in connection with FIGS. 5 and 6.

In operation, SLAVE REQUEST signals from the VMEbus are intercepted by the slave address decoder 100 and passed to the bus arbiter 104 which switches the microprocessor 66 interface circuitry between the normal DMA circuitry and the VMEbus SLAVE REQUEST circuitry. A common address and data bus structure 177 acting through bidirectional buffer 116 under control of bus/RAM controller 114 directs data flow to the random access memory 72 and between the AT bus 68 and VMEbus 70. Address translation circuitry 120 allows both the contiguously mapped VMEbus and the noncontiguously mapped AT bus to address the contiguously arranged dual access RAM 72. This circuitry allows the microprocessor 66 to communicate over the VMEbus as a fully functional VMEbus slave.

The remainder of the circuitry illustrated in FIG. 4 allows the microprocessor 66 to communicate over the VMEbus 70 as a fully functional VMEbus master. The VMEbus master address decoder circuit 124 is connected to the AT bus 68 and monitors the address lines to determine if certain memory addresses reserved for VMEbus access have been addressed by microprocessor 66. The present invention provides two different methods for accessing the VMEbus. When the microprocessor 66 is in the real mode, communication is through a 64K window located above the 640K MS DOS memory partition. When microprocessor 66 is in the protected mode, communication is through a different block of memory located above the 1 megabyte real mode/protected mode boundary. These memory locations are illustrated in FIGS. 5 and 6 and will be discussed more fully below.

When VMEbus master address decoder 124 detects that microprocessor 66 has accessed the designated real mode window or the protected mode memory space, a VME REQUEST signal is issued on line 126 to the VMEbus requester circuit 128. The VMEbus requester circuit is a circuit defined by the VMEbus specification for the purpose of asserting bus request signals to the VMEbus and waiting for the bus grant signal from the VMEbus arbiter in return. The VMEbus requester circuit under the VMEbus specification also determines upon receipt of a bus grant signal whether it will honor the bus grant or whether it will pass the bus grant in daisy chain fashion to the next circuit board attached to the VMEbus backplane.

The VMEbus requester conveys the VMEbus GRANT signal to the VMEbus master controller 130 which actually controls the cycle on the VMEbus. When the VMEbus master controller 130 first receives the VMEbus GRANT it will turn on the bidirectional buffers 116 causing them to point outward to the VMEbus 70. The address issued by microprocessor 66 is thus conveyed over the bus structure 117 through bidirection buffers 116 to the VMEbus 70 for mapping onto the VMEbus address lines.

Address lines A1-A15 are directly mapped from the AT bus 68 to the VMEbus 70. In order to issue VMEbus addresses A16-A23, a VMEbus address generator circuit 132 is provided. The address generator circuit is responsive to VME master address decoder 124 and receives address signals from the AT bus via bus structure 117. The master address decoder circuit 124 issues a WINDOW ACCESS signal on line 134 which instructs the address generator 132 whether microprocessor 66 is in the real mode (using the 64K window) or in the protected mode (using the memory space above the real mode/protected mode boundary). When the microprocessor is in the real mode, the VMEbus address generator generates the appropriate VMEbus address signals for A16-A23. When microprocessor 66 is in the protected mode, the actual addresses on AT bus 68 are mapped via bus structure 117, through address generator circuit 132 directly to the VMEbus address lines A16-A23. The VMEbus address generator circuit 132 has a VMEbus High Address register for holding the appropriate A16-A23 values for mapping onto the VMEbus when microprocessor 66 is in the real mode.

Depending on whether a READ or a WRITE is being executed, the bidirectional buffer 116 is appropriately directed by bus master controller 130, which is in receipt of the data strobe (DS), the address strobe (AS) and the data transfer acknowledge (DTACK) signals on control lines 136. When the bus master controller determines that the data transfer cycle from the VMEbus slave being accessed has been completed, it issues a READY signal on line 138 to microprocessor 66. When microprocessor 66 initiates a VMEbus master sequence, it enters a wait state which remains in effect until the selected slave has responded. The READY signal signals microprocessor 66 that the communication with the selected slave has been completed, whereupon microprocessor 66 terminates the wait state and returns to normal operation.

In order to provide full VMEbus addressing capability, the interface circuitry 74 also includes an address modifier generator circuit 140 which provides the address modifiers AM0-AM5 used to convey VMEbus information such as the address size, cycle type, and/or master identification in accordance with VMEbus standards. The circuit also includes an interrupt acknowledge driver circuit 142 which receives interrupt acknowledge (IACK) signals from the VMEbus used by an interrupt handler on the VMEbus to acknowledge an interrupt request. The interrupt acknowledge driver circuit receives interrupt acknowledge cycle signals on line 144 from the master address decoder 124. master address decoder 124 maps certain AT address calls as interrupt requests by the microprocessor 66. In the first preferred embodiment certain predefined addresses on the AT bus are treated as interrupt request lines. When one of these addresses is selected, master address decoder 124 issues the IACK CYCLE signal which causes IACK driver 142 to generate the appropriate IACK signal. A more complete discussion of the presently preferred interrupt handling scheme is presented below in connection with the system software operation.

The VMEbus/AT bus interface defined by the invention may be further understood with reference to the memory map diagrams of FIGS. 5 and 6. Both memory maps depict the memory space as seen by microprocessor 66. FIG. 5 depicts a 1 megabyte memory map model whereas FIG. 6 depicts a 4 megabyte memory map model. A comparison of the two memory maps reveals the principal difference being the amount of dual access RAM above the 1 megabyte real mode/protected mode boundary. That boundary is designated by reference numeral 146 in both Figures. The 80286 real mode memory space is below boundary 146 and the protected mode memory is above boundary 146.

As illustrated in FIGS. 5 and 6, beginning at the base address, both memory map models allocate 16 bytes for implementing a VMEbus interrupt handling scheme using the dual access memory. If a VMEbus master reads one of these 16 bytes, the master address decoder 124 generates an interrupt to microprocessor 66. In this fashion, master devices on the VMEbus which cannot generate interrupts, as many masters cannot, are able to interrupt microprocessor 66. The 16 bytes of dual access memory allocated for interrupt handling is designated at 148. This same memory space is used in the AT system architecture for storing vector jump addresses and this use remains unchanged in the present invention. Thus microprocessor 66 is still able to access the memory space 148 to determine vector jump addresses in the usual fashion. The act by a VMEbus master of reading memory space 148 triggers the interrupt. The VMEbus master normally has no use for the data residing in memory space 148 (AT vector jump addresses) and hence this data may normally be ignored by the VMEbus master. In other words, it is the act of reading memory space 148 by the VMEbus master which generates the interrupt to microprocessor 66. The values returned by the reading of this memory space are of no importance to the interrupt cycle.

This dual use of memory space 148 is quite advantageous, since it permits the conveyance of interrupt signals to microprocessor 66 without requiring additional interrupt lines not defined by the VMEbus standard and at the same time permits the memory space to be used in the conventional fashion as an AT vector address jump table. This mapping of nonanalogous functions (interrupting and data storage) can of course be implemented at other memory spaces within the memory map. The selection of the low 16 bytes is presently preferred since the VMEbus master devices will normally have no reason to access this memory space for data, the data being valid only as an AT vector jump address.

Above memory space 148 is a 640K block of dual access RAM 150 which may be accessed as conventional MS DOS memory by the AT system. Above the RAM space 150 the next 256K bytes are allocated as input/output channel devices 152. Memory space 152 is typically allocated to EPROM devices on adapter cards, such as video cards or other external adapter cards which are attached to the AT bus and communicate with it over the AT input/output channel.

Above memory space 152 there is a 64K memory space defined as the real mode window 154. It is this window through which the AT computer system comprising microprocessor 66 and associated AT architecture may communicate with the VMEbus, when microprocessor 66 is in the real mode. Real mode window 154 lies immediately adjacent the AT onboard EPROM space 156 which contains the conventional BIOS for the AT system. As illustrated, the EPROM space 156 lies immediately below the 1 megabyte boundary 146. The first preferred embodiment requires 64K for the system BIOS. The IBM AT specification reserves 128K for the system BIOS, a portion of that 128K being unused. The real mode window 154 may comprise all or a portion of the memory space reserved, but unused, for the AT BIOS.

Above boundary 146 the system has additional dual access RAM 158. The size of this RAM will depend upon the amount of memory installed on the CPU card 24. In the 1 megabyte memory model of FIG. 5 RAM space 158 contains 384K. In the 4 megabyte memory model of FIG. 6 the RAM space 158 contains 3,456K. In both instances the size of the additional dual access RAM will be the amount of total memory (e.g., 1 megabyte or 4 megabyte) minus the 640K of dual access RAM residing at space 150. Physically RAM 72 comprises the dual access RAM memory (1 megabyte or 4 megabyte in the presently preferred embodiments). FIGS. 5 and 6 illustrate how RAM 72 is arranged as noncontiguous blocks residing at memory spaces 150 and 158.

The present invention allows the AT computer implemented by microprocessor 66 to address memory residing in the VMEbus standard address space. That space is designated by reference numeral 160 in FIGS. 5 and 6. As a general rule, microprocessor 66 of the AT computer system can access onboard memory, i.e., memory attached conventionally to the AT bus structure, more quickly than it can access memory attached to the VMEbus. If a particular system needs additional fast access memory, additional AT compatible memory circuits can be attached to the AT bus for this purpose. FIG. 5 illustrates an example of such an implementation where the additional onboard memory is designated as input/output (I/O) channel memory 162. For comparison purposes, similar input/output channel memory is not illustrated .: FIG. 6. While memory in both the VMEbus standard address space 160 and the input/output channel memory space 162 are both accessible to microprocessor 66, the VMEbus standard address space 160 must be accessed through the master interface circuitry of FIG. 4, whereas the input/output channel memory 162 may be accessed directly via the AT bus.

Comparing FIGS. 5 and 6, one principal difference is that in the 4 megabyte model of FIG. 6 the CPU card 24 is populated with 4 megabytes of memory, 3,456K of that memory residing above the 1 megabyte boundary 146. In the 1 megabyte model of FIG. 5 only 384K above the 1 megabyte boundary 146 is populated. The remaining 3,072K, designated as input/output channel memory 162, is not populated on CPU card 24 but instead reserved for user upgrade by attaching external memory cards. Stated differently, the 3,456K space above boundary 146 is fully populated by dual access RAM memory in the model of FIG. 6, whereas it is only partially populated with RAM (384K) with the remainder (3,072K) being reserved for input/output channel memory in the model of FIG. 5.

The VMEbus standards define a standard address space of 16 megabytes. Only a portion of that standard address space is accessible to microprocessor 66. This standard address space which the AT microprocessor 66 can address is designated at 160. In addition, the VMEbus specification defines a separate Short input/output address space which is separate from the standard 16 megabyte memory space. Microprocessor 66, when in the protected mode, can access this Short input/output address space as designated at 164. Other provisions are made for accessing the Short input/output address space when the microprocessor 66 is in the real mode, as will be discussed below.

The VMEbus standard also defines how interrupt handling occurs using the Priority Interrupt Bus through a VMEbus IACK cycle. The invention defines a VMEbus IACK space 166 as part of the memory map. This IACK space is not a defined memory space within the VMEbus standards. This memory space 166 is defined by the invention to permit initiation of an IACK cycle using a technique similar to the technique used to generate interrupts through access of memory space 148. More specifically, individual addresses within IACK space 166 are defined as individual VMEbus interrupt levels, i.e., levels 1-7. When microprocessor 66 is in the protected mode, the act of reading a selected memory location within IACK space 166 by a VMEbus device is interpreted as a VMEbus interrupt at the level corresponding to the level assigned to the address read.

The final memory space in the memory maps of FIGS. 5 and 6 is mapped as onboard EPROM space 168. The actual AT EPROM, containing system BIOS, resides at space 156 (it will be recalled that the real mode window space 154 occupies part of the 128K space allocated by the AT system for BIOS). Intel microprocessors such as the 80286 microprocessor 66 begin the power-on cycle by reading the uppermost byte of high memory (FFFFFF). When the IBM XT standard was defined, the uppermost byte resided at OFFFFF, on the 1 megabyte boundary 146. Accordingly, system BIOS was placed at that location with the instruction at OFFFFF being a jump to the beginning of the BIOS boot up sequence. When the AT computer was developed it was desired to remain compatible with the prior XT standards. To do this, the uppermost portion of memory, containing address FFFFFF, was mapped onto the EPROM space residing immediately below the 1 megabyte boundary 146. In this fashion, the initial jump instruction was made accessible to the more powerful 80286 microprocessor which powered up by accessing the uppermost byte in the 16 megabyte boundary instead of the uppermost byte at the 1 megabyte boundary. In practice, only the jump instruction at address FFFFFF is needed in order to power up the system. Thus the additional memory space within onboard EPROM space 168 may be allocated for other purposes, if desired.

The system software allows any memory reference by microprocessor 66 in the range 16000-FBFFFF to map into the VMEbus standard address space. The microprocessor's 24 bit address bus is mapped directly onto the 24 bit VMEbus address bus. The microprocessor 66 must be in protected mode to access this memory space. The address range from FC0000-FCFFFF is used to perform VMEbus Interrupt acknowledge cycles. A byte read from this address space will cause the invention to perform a VMEbus interrupt cycle (interrupt handler). The interrupt level acknowledged depends on the address of the byte read in accordance with the following Table II. Microprocessor 66 must be in protected mode in order to perform VMEbus IACK cycles through this address space.

TABLE II

| 80286 Address | VMEbus Interrupt Level |
|---|---|
| FC0003 | 1 |
| FC0005 | 2 |
| FC0007 | 3 |
| FC0009 | 4 |
| FC000B | 5 |
| FC000D | 6 |

TABLE II-continued

| 80286 Address | VMEbus Interrupt Level |
|---|---|
| FC000F | 7 |

Any reference by microprocessor 66 to bytes in address space FD0000-FDFFFF will reference the VMEbus Short I/O address space. The lower 16 bits of the microprocessor 66 address bus is used to select a byte in the 64 K Short I/O space. Microprocessor 66 must be in protected mode to access the Short I/O in this fashion.

The system software defines an I/O map which contains all the I/O ports of the IBM AT architecture and some additional ports. Six extra I/O ports are defined at I/O address space 30-35H. These 8 bit I/O ports are mapped as follows.

TABLE III

| I/O Port Address | I/O Port Name | Access |
|---|---|---|
| 30H | CONREG | IN/OUT |
| 31H | AUX_INT | IN ONLY |
| 32H | STATUS_1 | IN ONLY |
| 33H | STATUS_2 | IN ONLY |
| 34H | VME_HI_ADD | OUT ONLY |
| 35H | TRIG_WDT | IN/OUT |

The I/O port designated CONREG is the control register used to control many module functions. All bits of this port are set to zero when the module is reset. The bits are defined as set forth in Table IV below. Referring to Table IV it will be seen, for example, that the real mode window, by which microprocessor 66 communicates with the VMEbus in real mode, is controlled by bits 5 and 6 (D5, D6) of the CONREG port. A more complete discussion of this mode of control is set forth below.

TABLE IV

| | |
|---|---|
| D0 = 0 | The watchdog timer is disabled. |
| D0 = 1 | The watchdog timer is enabled. |
| D1 = 0 | The FAIL LED is on and the 682 is asserting SYSFAIL. |
| D1 = 1 | The FAIL LED is off and the 682 is not asserting SYSFAIL. |
| D2 = 0 | The PASS LED is off. |
| D2 = 1 | The PASS LED is on. |
| D3 = 0 | The VMEbus requester is to release the VMEbus. |
| D3 = 1 | The VMEbus requester is to acquire the VMEbus. |
| D4 = 0 | Auxiliary NMI sources are disabled. |
| D4 = 1 | Auxiliary NMI sources are enabled. |
| D6 = 0, D5 = 0 | Real mode window set to EPROM access. |
| D6 = 0, D5 = 1 | Real mode window set to VMEbus Short I/O access. |
| D6 = 1, D5 = 0 | Real mode window set to VMEbus Standard access. |
| D6 = 1, D5 = 1 | Real mode window set to VMEbus IACK cycle. |
| D7 = 0 | Auxiliary maskable interrupt disabled. |
| D7 = 1 | Auxiliary maskable interrupt enabled. |

With continued reference to Table III, the I/O port entitled AUX_INT is read to determine which auxiliary inputs (VMEbus interrupt 1-7 and the dual port interrupt) are pending. The port entitled STATUS_1 is used to indicate whether certain nonmaskable interrupt (NMI) latches are set, and whether an I/O channel error latch is set. Port STATUS_2 is a status port which determines certain operating conditions such as where dual access RAM 72 is mapped on the VMEbus, whether the VMEbus requester has ownership of the VMEbus, whether the VMEbus signals SYSFAIL and ACFAIL have been asserted and whether the watchdog timer has timed out. Port VME_HI_ADD is an output port used to provide the upper 8 address bits when the VMEbus Standard address space is accessed through the real mode window. This port identifies which of the available 256 64K blocks is being addressed in the VMEbus. Port TRIG_WDT is used to trigger the watchdog timer. Inputs or outputs to this port will trigger the watchdog timer. No data is exchanged during these accesses.

In use, the real mode window is 64K bytes long and resides at addresses OE0000-OEFFFF. The window provides a mechanism for addressing the entire VMEbus memory space without the need to enter the microprocessor 66 protected mode. The window can be configured, via software, to address one of four entities: VMEbus Short I/0, VMEbus Standard address space, VMEbus IACK space, and EPROM.

The window is controlled by bits 5 and 6 of I/O port CONREG, as noted above. By appropriately setting bits 5 and 6 of the CONREG port one of the four above-named entities is selected. When the window is configured for EPROM the lowest 64K bytes of EPROM will appear in the window. This is the mode selected after reset. This mode is compatible with the IBM AT architecture. When the window is configured for the VMEbus IACK space, a byte read from the window will cause the invention to perform a VMEbus IACK cycle. The data returned from the byte read will be the status ID vector returned from the responding interrupter. In the first preferred embodiment the VMEbus interrupt level acknowledged depends on the window address read. For example, window address OE0003 corresponds to VMEbus interrupt level 1. Window address OE0005 corresponds to VMEbus interrupt level 7, and so forth.

When the window is configured for VMEbus Short I/O, the 64K Short I/O address space may be accessed through the 64K window. Any references to the window will map into the VMEbus Short I/O space with the lower 16 address bits of microprocessor 66 being used as the VMEbus 16 bit address. For example, to read byte 1234H in the Short I/O address space, the window is configured for Short I/O and a byte is read at address OE1234H.

When the window is configured for VMEbus Standard address space, the 64K window may be used to access any 64K block of the Standard VMEbus address space. In this mode, the 16 megabyte Standard address space is logically divided into 256 64K blocks. During these VMEbus accesses, the lower 16 address bits of microprocessor 66 are used as the lower 16 VMEbus address bits. The upper 8 VMEbus address bits used for the cycle are obtained from the 8 bit register VME_HI_ADD. Register VME_HI_ADD is an output port to microprocessor 66 residing at I/O address 34H.

Before accessing the window in this mode the upper 8 VMEbus address bits must be sent to register VME_HI_ADD. This defines which 64K byte block of the Standard VMEbus address space will be accessed. Subsequent accesses to the window will use the 8 bits in VME_HI_ADD and the lower 16 bits of the microprocessor's address form the 24 bit VMEbus address. For example, to read word 123456H in the VMEbus Standard address space, the window is configured for VMEbus Standard address space and the value 12H is output to port VME_HI_ADD (address 34H).

A word is read at address OE3456H. The word returned will be from VMEbus address 123456H.

In order to effect a VMEbus master cycle bit 3 of port CONREG is set to 1 and bit 4 of port STATUS_2 is polled, waiting until its value becomes 0. A VMEbus master/interrupt handler cycle may then be executed as required followed by the resetting of bit 3 of CONREG to 0. The invention retains control of the VMEbus for duration of the master/interrupt handler cycle. It may be necessary to minimize the time taken for this cycle in systems which require fast access by other VMEbus masters.

VMEbus cycles may be terminated with BERR or DTACK. The invention detects BERR, the assertion of which has the same effect as a parity error on the I/O channel. The BERR signal is linked into the IBM AT architecture in the same manner as described in connection with other signals. Bit 3 of I/O port B (I/O address 16H) enables the BERR* signal. When enabled, the assertions of BERR during a master cycle by the invention will cause a latch to set. The status of this latch can be detected by bit 0 of input port STATUS_1. When the bit is set, the BERR latch is set, generating an I/O channel error nonmaskable interrupt (NMI). This will also set bit 6 of I/O port B, indicating an I/O channel error. The latch is reset by sending the value 1 to bit 3 of the AT port B. If desired, a jumper may be used to disable the BERR signal. When disabled, the BERR signal will not cause I/O channel errors.

VMEbus interrupts are handled by the system software as follows. Each VMEbus interrupt line has a bit position in the AUX_INT input port. VMEbus interrupt level 7 corresponds to AUX_INT bit position 7, and so on through the VMEbus interrupt level 1, which corresponds to AUX_INT bit position 1. When a particular bit in AUX_INT is set, the corresponding VMEbus interrupt is pending.

When the microprocessor 66 receives an interrupt on IRQ10_IRQ12 or IRQ15, the user program must read the AUX_INT port to determine the VMEbus interrupt level. The user program must perform a read in the VMEbus IACK space to obtain the vector and complete the VMEbus IACK cycle. Software should check to ensure the VMEbus interrupter has negated its interrupt before leaving the interrupt service routine.

Another VMEbus master may interrupt the invention by reading any one of the lower 16 bytes of the dual access RAM 72. When this access occurs the dual port interrupt is latched and remains latched until bit 7 of CONREG is reset. The status of this interrupt is available in AUX_INT bit 0. When bit 0 is set, the interrupt is pending. The dual port interrupt must be cleared by resetting bit 7 of CONREG. If desired, a jumper may be provided to enable and disable this interrupt.

The invention implements auxiliary nonmaskable interrupts for the abort button, the watchdog timer and VMEbus signals SYSFAIL and ACFAIL. The IBM AT architecture provides a mechanism to disable and enable nonmaskable interrupts. An output to port 70H with D7 - 0 will enable nonmaskable interrupts. An output to port 70H with D7 - 1 disables nonmaskable interrupts. This same mechanism will enable and disable the additional nonmaskable interrupts provided by the invention. All four of these additional interrupts are implemented as latches. When the interrupt event occurs and is enabled, the latch will set. The latch remains set until the interrupt is disabled or a system reset occurs.

SYSFAIL, ACFAIL and the abort button are all enabled by bit 4 of CONREG. If bit 4 is on, the occurrence of the interrupt event will set a latch, which remains set until bit 4 is reset. When the latch is set a nonmaskable interrupt will occur if the module nonmaskable interrupt is enabled. The state of these latches can be determined by checking input port STATUS_1. SYSFAIL latch is bit 2, ACFAIL latch is bit 1 and the abort button latch is bit 3. When these bits are high, the corresponding latch is set.

A watchdog timer interrupt is enabled by bit 0 of CONREG. The watchdog timer has a timeout period approximately 150 milliseconds in the presently preferred embodiment. If bit 0 of CONREG is set and the watchdog timer expires, a latch will set and remain set until bit 0 of CONREG is reset. If the module nonmaskable interrupt is enabled, the setting of this latch will generate an auxiliary nonmaskable interrupt. The state of this latch is available in bit 7 as input port STATUS_2. When the latch is set, bit 7 will read 0. When the latch is reset, bit 7 will read 1.

The watchdog timer is triggered from outputs or inputs through input/output port TRIG_WDT. When the watchdog timer times out and causes an auxiliary nonmaskable interrupt, the watchdog timer cannot be retriggered until bit 0 of CONREG is reset. In the presently preferred embodiment all four auxiliary nonmaskable interrupts can be permanently disabled by changing a jumper.

Referring now to FIG. 7, there is shown an alternative preferred embodiment in accordance with the present invention. In this embodiment, an 80386 Intel microprocessor 200 has been substituted for the 80286 microprocessor 66 of FIG. 3. The 80386 processor 200, like the 80286 processor 66, has a plurality of CPU ports and can be operated in either the real or protected mode. This feature allows the 80386 based embodiment of the present invention to address one megabyte of memory while in the real mode, and yet provide compatibility with earlier 8086 and 8088 microprocessors. In the protected mode the 80386 processor 200 can address four gigabytes of memory.

The flexibility of the real mode window has been further enhanced by the addition of a second, 8 bit, high address register within the address generator circuit 132 (shown in FIG. 4). The second high address register enables the real mode window to be positioned over the address space defined by the VMEbus address lines A24-A31.

The embodiment of FIG. 7 further includes a VGA controller 202 with ROM BIOS expansion and an SCSI controller 204 with ROM BIOS expansion. Both TTL and analog video interfaces are also included, which enable the 80386 based embodiment of FIG. 7 to be used with either an EGA or a VCA monitor.

The 80386 microprocessor 200 is coupled via a local bus 206 to an 82385 Intel cache controller 208, an 8K×32 bit cache memory 210 and an 80387 Weitek math coprocessor chip 212. The 82385 cache controller 208 is also coupled via line 78 and line 76 to the interface circuitry 74. The 82385 cache controller 208 is further provided with a "bus snoop" 214 for detecting writes to the dual access RAM 72.

The 82385 cache controller 208 and cache memory 210 of the present invention allow the 80386 processor 200 to run at about 25 MHz without wait states. In operation, when processor 200 executes code or fetches data, a copy of the code or data is stored in the cache memory 210. When the processor 200 re-executes the same code or fetches the same data the cache controller 208 places the information from the cache memory 210 on local bus 206 for consumption by the processor 200. Accordingly, the processor 200 is able to execute a particular piece of code or retrieve a piece of data without waiting for a slower memory device to respond.

The bus snoop 214 of the present invention eliminates a problem that could otherwise exist when other VMEbus masters are allowed to change the contents of the dual access RAM 72. In such a case, the processor 200 could end up addressing memory locations within the dual access RAM 72 which have been written over by a VMEbus master. In such instances, the processor 200 would actually be unknowingly accessing stale data. The bus snoop 214 insures against this type of problem by watching for accesses to the dual access RAM 72. When the bus snoop 214 detects a write to a dual access RAM memory location, it only invalidates the portion of the cache memory that contains that entry. If the write by a VMEbus master is to a non-cached memory location, the bus snoop 214 takes no action and the content of the cache memory 210 is unaffected.

With further reference to FIG. 7, a master byte control register circuit 216 and a slave byte control register circuit 218 are interposed between the VMEbus 70 and the interface connect circuitry 74. The master and slave byte control register circuits 216 and 218 respectively communicate with the interface connect circuitry 74 via a dual ported RAM bus 220. An additional communications bus 222 is also included which enables the bus snoop 214 to detect writes to the dual access RAM 72. The functions of the master and slave byte control register circuits 216 and 218 will be discussed momentarily in connection with FIG. 10.

Figure 9:
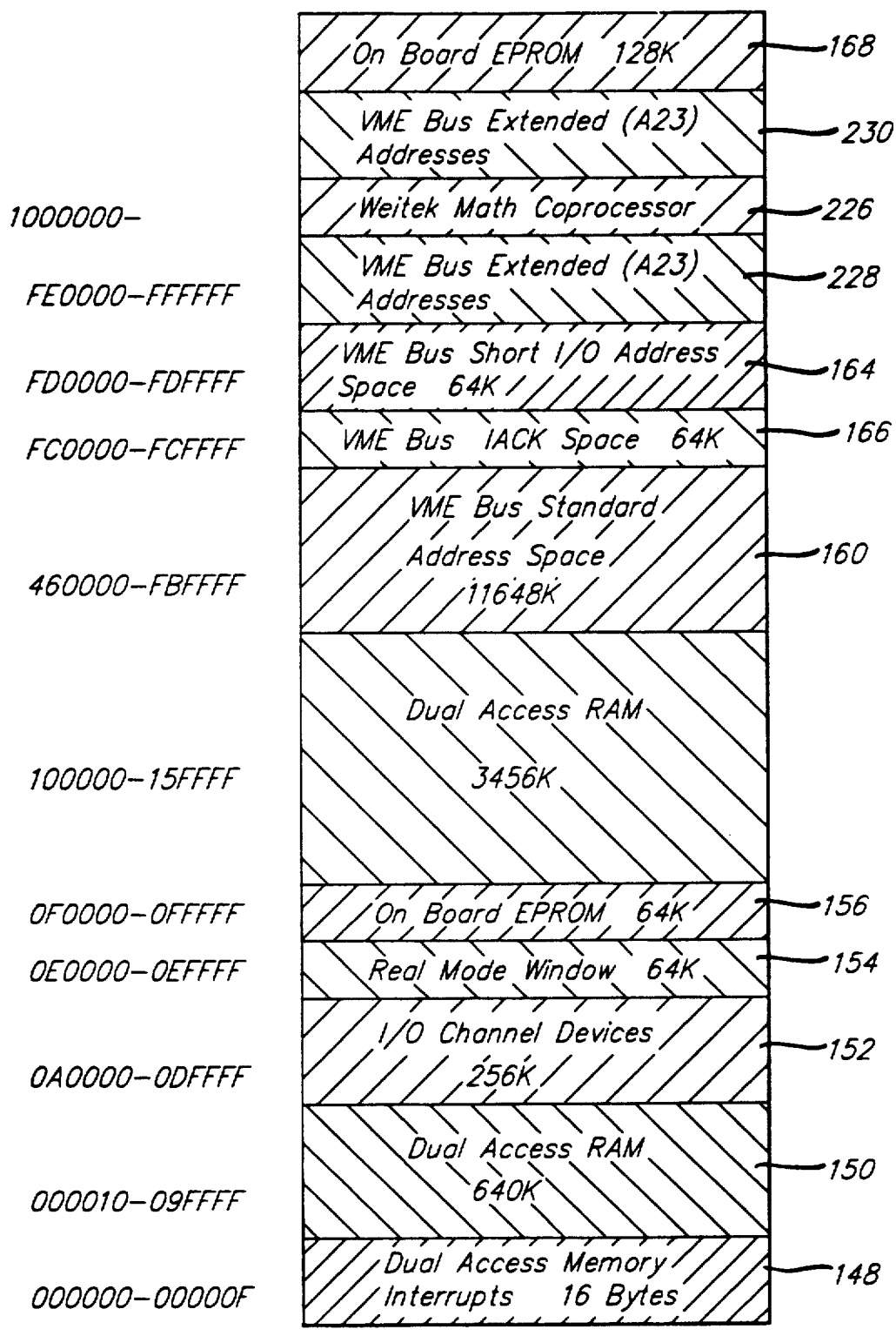
FIG. 9 is a memory map of a 4 megabyte embodiment of an alternative preferred embodiment of the present invention, as seen by the 80386 microprocessor.

In FIG. 8 a memory map 224 is shown which incorporates the Weitek math coprocessor 212 address space 226 and the VMEbus extended (A32) address spaces 228 and 230. In FIG. 9, a 4 megabyte embodiment 232 of the memory map of FIG. 8 is illustrated. Like the memory maps of FIGS. 5 and 6, the principal difference between the memory maps of FIGS. 8 and 9 is the additional amount of dual access RAM in the memory map of FIG. 9. In both FIGS. 8 and 9 the VMEbus extended address spaces 228 and 230 are located above the VMEbus short addresses 164 and comprise 4 gigabytes of addressing space. All 4 gigabytes are addressable through the real mode window while in the real addressing mode.

Figure 10:
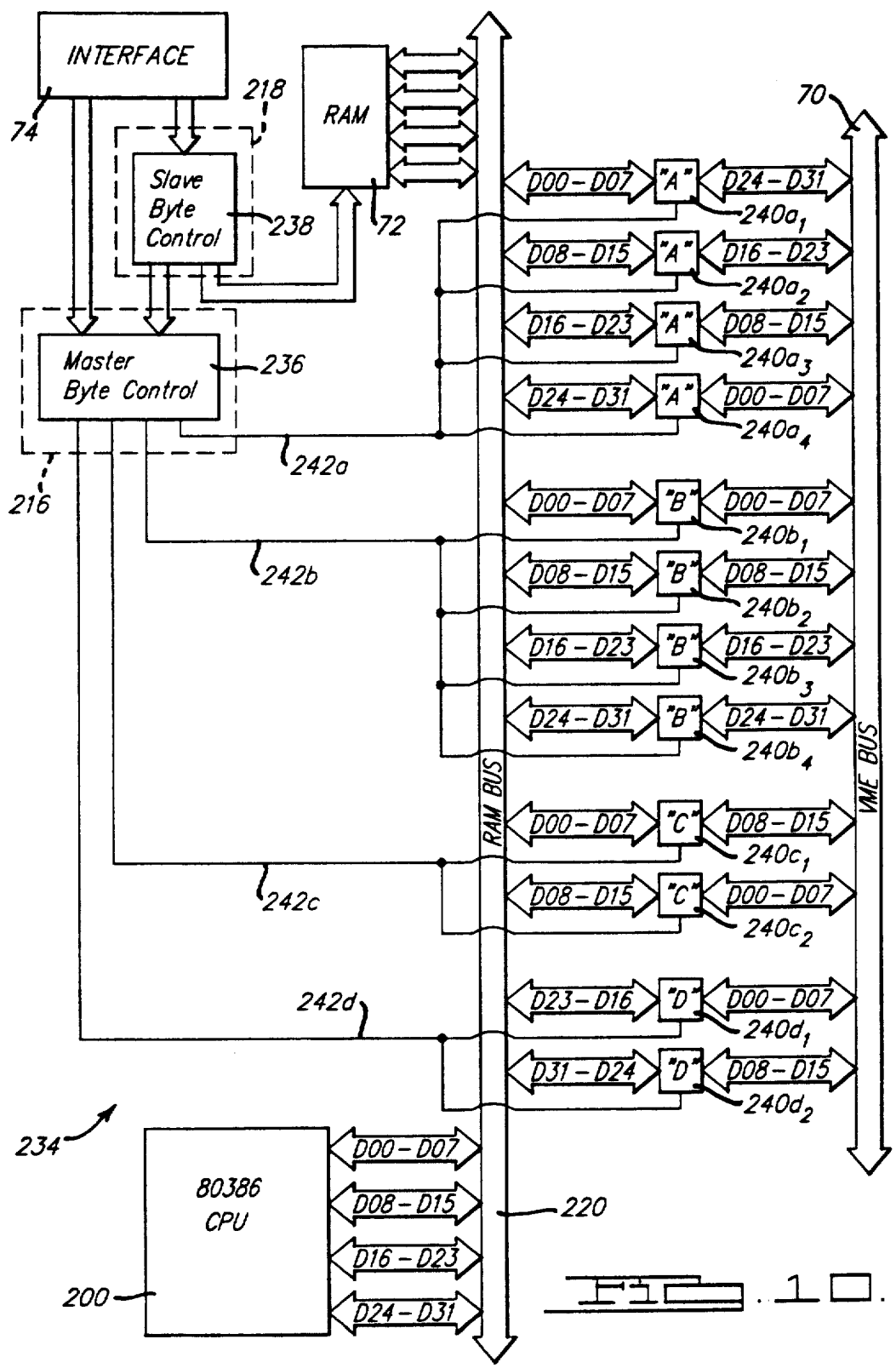
FIG. 10 is a simplified block diagram of the byte swapping circuit of an alternative preferred embodiment of the present invention.

With reference now to FIG. 10, a block diagram of a byte-swapping circuit 234 in accordance with the present invention is shown. The byte-swapping circuit 234 overcomes the byte ordering problems inherent in interfacing a Motorola processor based system with an Intel based system. These byte ordering problems arise because Motorola processors store the most significant byte (MSB) of a word or longword at the lowest memory address and the least significant byte (LSB) at the highest memory address. The Intel family of processors, however, store their data in the opposite fashion: the MSB is at the high memory address and the LSB is at the low memory address. Accordingly, both bytes of a word or all 4 bytes of a longword must be "swapped" when passing information between the CPU ports of Intel and Motorola processors for proper data transfers to occur.

The byte-swapping circuit 234 of the present invention eliminates the above-described problem by providing a master byte control programmable array logic (PAL) device 236 included within the master byte control circuitry 216; a slave byte control programmable array logic (PAL) device 238 included within the slave byte control circuitry 218; a first plurality of "A" buffers $240a_1$-$240a_4$; a second plurality of "B" buffers $240b_1$-$240b_4$; a third plurality of "C" buffers $240c_1$-$240c_2$; and a fourth plurality of "D" buffers $240d_1$-$240d_2$. The master byte control PAL 236 and slave byte control PAL 238 are further coupled with the interface connect circuitry 74 and with each other. The slave byte control PAL 238 is also coupled with the dual ported RAM 72. In the alternative preferred embodiment the buffers $240a_{1-4}$ through $240d_{1-2}$ each comprise a 74F1245 bidirectional transceiver while the master and slave byte control PAL each comprise a GAL 20V8 programmable array logic device. It should be appreciated, however, that discrete TTL logic circuitry could also be readily employed to perform the functions of the PALs 236 and 238 as well as other programmable-type logic devices. Similarly, a wide variety of bus transceivers could also readily be employed as buffers in lieu of the 74F1245 transceivers.

The A buffers $240a_{1-4}$ of the present invention are operable to selectively reorder or "swap" the least significant byte (LSB) and the most significant byte (MSB), as well as the remaining two bytes of a 32 bit word when the word is transmitted between the CPU communications ports of processor 200 and the communications ports of the VMEbus 70. The B buffers $240b_{1-4}$ are included for allowing the bytes of a word to be transferred between the CPU and VMEbus ports without altering their order. This is useful in applications where the Intel processor 200 is accessing memory together with another Intel processor-based device. The C buffers $240c_{1-2}$ enable the upper and lower bytes of a 16 bit word to be swapped before the word is transferred between the CPU 200 ports and the VMEbus ports. The D buffers $240d_{1-2}$, similarly, enable the upper two bytes of a 32 bit word to be swapped and placed in accordance with the memory locations associated with the lowermost two bytes of the word before the word is transferred between the CPU 200 ports and the VMEbus 70 ports.

The master byte control register PAL 236 further has four independent groups of output control lines 242a through 242d which couple with the output enable inputs of each group of buffers $240a_{1-4}$ through $240d_{1-2}$ to provide independent control over the enablement of each group of buffers.

In operation, before the Intel 80386 processor 200 writes a 32 bit word or longword to memory to be ultimately read by the VMEbus processor, the interface connect circuitry 74 provides a control signal to the master byte control PAL 236. The control signal sets a bit in PAL 236 at a logic "0" which causes PAL 236 to provide a logic "0" level (XLVRA) signal from pin 18 thereof, via control lines 242a, to the output enable inputs of the A buffers $240a_{1-4}$, thus enabling buffers $240a_{1-4}$. When the processor 200 then sends a longword to memory to be ultimately transmitted over the VMEbus 70, the bytes of the longword will be automatically reordered by the A buffers $240a_{1-4}$ into a form which is properly readable by a VMEbus device. That is, the fourth, or upper, byte will be ordered in accordance with the lowest memory address associated with the word, the third, or next highest, byte will be ordered in accordance with the second lowest memory address, the second byte will be ordered in accordance with the third lowest memory address, and the first, or lower byte, will be ordered in accordance with the highest memory address associated with the word.

If a 32 bit longword is to be transferred to the VMEbus 70 by the processor 200 to be read by another Intel processor, then interface connect circuitry 74 provides a control signal to the master byte control register PAL 236. This signal causes the register 236 to send a logic "0" level XLVRC signal via pin 19 of register 236 on control line 242b to the output enable inputs of the B buffers $240b_{1-4}$. When the bytes of a longword are then passed between the CPU 200 and the VMEbus 70, their order will remain unaltered. This feature of the present invention is especially desirable when an I/O intensive operation is taking place between the processor 200 and a VMEbus I/O board. If the A buffers $240a_{1-4}$ were always used, the data would have to be preswapped, either by additional hardware or programatically, before being sent to the I/O board.

If only a 16 bit word is being transferred to memory 72 by the processor 200, interface connect circuitry 74 provides a control signal to the master byte control PAL 236. This causes a logic "0" level (XLVRB) control signal to be transferred from pin 26 of register 236 to the output enable inputs of the C buffers $240c_{1-2}$, thus enabling the C buffers $240c_{1-2}$ and causing the upper and lower bytes to be swapped when transferred between the CPU 200 and the VMEbus 70.

If only the upper two most bytes of a 32 bit word or longword are to be swapped, interface connect circuitry 74 provides a control signal to the master byte control PAL 236, which is operable to cause a logic "0" level (XLVRD) signal to be output from pin 21 of register 236 on control line 242d. The logic "0" level XLVRD signal is applied to the output enable inputs of the D buffers $240d_{1-2}$, which causes the two uppermost bytes to be swapped and placed at memory locations normally associated with the lowermost two bytes when the bytes are transferred between the CPU 200 and VMEbus 70 respectively.

The byte swapping circuit 234 of the present invention thus not only allows the bytes of a 32 bit word transferred between the 80386 processor 200 and the VMEbus 70 to be selectively reordered, it also allows for the "straight through" passage of information to another VMEbus-based I/O board. In addition, the byte swapping circuit 234 is operable to swap the upper and lower bytes of a sixteen bit word, as well as the upper two most bytes of a 32 bit word.

The byte swapping circuit 234 of the present invention is further operable to selectively enable specific groups of buffers when a VMEbus master is accessing the RAM 72. This is accomplished by a control signal generated by the interface connect circuitry 74 to the slave byte control PAL 238. The control signal causes the slave byte control PAL 238 to send a signal to the master byte control PAL 236. This causes PAL 236 to selectively provide a control signal on one of the control lines 242a-d to selectively enable the group of buffers necessary for a proper data transfer to occur, in the same fashion as was just described above. The slave byte control PAL 238 further sends a signal to the RAM 72 to instruct the RAM 72 as to which RAM bank to address. Thus, the master and slave byte control PALs 236 and operate cooperatively to enable the bytes of a word or longword to be swapped when being transferred between the RAM 72 and the VMEbus 70 whether the 80386 processor 200 is acting as a master device or whether a VMEbus device is acting as a master device. The pin configuration for the master byte control PAL 236 is as follows:

PIN 2 -VBDS0
PIN 3 - VBDS1
PIN 4 -VMEAL
PIN 5 -LWORD
PIN 7 -RAS
PIN 10 -SLAVE
PIN 11 -BBE0
PIN 12 -BBE1
PIN 13 -BBE2
PIN 16 -BBE3
PIN 17 - XLVRD
PIN 27 - VDERIN
PIN 18 -BYTEN1
PIN 19 -BYTEN2
PIN 20 -BYTEN3
PIN 24 -SLVXA
PIN 25 -SLVXB
PIN 26 -BYTEN0
PIN 9 - XLVRC
PIN 21 - VDEN
PIN 23 -JUMPER

The pin configuration for the slave byte control register PAL 238 is as follows:

PIN 2 - SLVXA
PIN 3 - SLVXB
PIN [4 . . . 7]-[BE3 . . . 0]
PIN 9 -JUMPER
PIN 10 -SBUF
PIN 11 -HASTER
PIN 12 - XKENU
PIN 13 - XMM
PIN 16 -DEN
PIN 17 -DBEN
PIN 27 -DS1
PIN 18 -XLVRA
PIN 19 - XLVRC
PIN 20 - VA1
PIN 21 -XLVRD
PIN 23 - VLWORD
PIN 24 -DS0
PIN 25 -DS1
PIN 26 -XLVRB

From the foregoing it will be understood that the present invention provides an interface apparatus which is well suited for interconnecting the Intel CPU of an AT computer with a VMEbus, to allow the AT computer to respond to the VMEbus as a slave device and also to allow the AT computer to respond as a VMEbus master. While the invention has been described in connection with specific examples thereof, it will be understood that certain modifications to the circuit may be made without departing from the spirit of the invention as set forth in the appended claims.

What is claimed is:

1. An apparatus for communicating with an external computer and a VMEbus to selectively order bytes of an N-bit word transmitted between said external computer and said VMEbus, wherein said N-bit word has bit positions 0-31 with said bit positions 0-7 representing an A byte, said bit positions 8-15 representing a B byte, said bit positions 16-23 representing a C byte, and said bit positions 24-31 representing a D byte, said apparatus comprising:

an AT computer having a central processing unit (CPU);
control register means responsive to said CPU for generating first, second, third and fourth control signals indicative of first, second, third and fourth byte orders;
first, second, third and fourth byte ordering means responsive to said control register means for selectively ordering said A,B,C and D bytes as said A,B,C and D bytes are transferred between said CPU and said VMEbus;
a bus in communication with said AT computer and said first, second, third and fourth byte ordering means;
said first, second, third and fourth byte ordering means being disposed in parallel with said bus;
said first byte ordering means moving said A byte to said 24-31 bit positions, said B byte to said 16-23 bit positions, said C byte to said 8-15 bit positions, and said D byte to said 0-7 bit positions, in response to said first control signal;
said second byte ordering means maintaining said A byte at said 0-7 bit positions, said B byte at said 8-15 bit positions, said C byte at said 16-23 bit positions, and said D byte at said 24-31 bit positions in response to said second control signal;
said third byte ordering means moving said A byte to said 8-15 bit positions and said B byte to said 0-7 bit positions, in response to said third control signal; and
said fourth byte ordering means moving said D byte to said 8-15 bit positions and said C byte to said 0-7 bit positions, in response to said fourth control signal;
said control register means generating one of said first, second, third and fourth control signals at a time to selectively enable one of said first, second, third and fourth byte ordering means to effect a desired byte ordering of said N-bit word.

2. The apparatus of claim 1, further comprising:
a dual ported random access memory (RAM) in communication with said bus and said first, second, third and fourth byte ordering means.

3. The apparatus of claim 1, wherein said control register means comprises:
a slave byte control register for generating a control signal for indicating that a VMEbus cycle is occurring and for selecting one of said first, second, third and fourth byte ordering means; and
a master byte control register for indicating when a CPU control cycle is occurring and for selecting one of said first, second, third and fourth byte ordering means.

4. An apparatus for interconnecting a bus of an external computer with a VMEbus and for selectively altering the order in which an A byte having bit positions 0-7, a B byte having bit positions 8-15, a C byte having bit positions 16-23 and a D byte having bit positions 24-31 of a 32 bit word are transmitted between said external computer and said VMEbus, and the order in which a first byte and a second byte of a 16 bit word, where said first byte occupies bit positions 0-7 and said second byte occupies bit positions 8-15, are transmitted between said external computer and said VMEbus, said apparatus comprising:
a RAM bus;

an AT computer having a central processing unit (CPU) responsive to a processing unit of said external computer and in communication with said RAM bus;

a dual access random access memory in communication with said RAM bus;

a first plurality of bidirectional buffers disposed in parallel with said RAM bus and said VMEbus for selectively ordering said A, B, C and D bytes of said 32 bit word from a first order to a second order when said A, B, C and D bytes are transmitted between said RAM bus and said VMEbus, wherein the first order is different from the second order;

a second plurality of buffers disposed in parallel with said RAM bus and said VMEbus for transmitting said A,B,C and D bytes of said 32 bit word between said RAM bus and said VMEbus without altering the order of said A,B,C and D bytes;

a third plurality of buffers disposed in parallel with said RAM bus and said VMEbus for ordering said first and second bytes of said 16 bit word such that said second byte is placed at said bit positions 0–7 and said first byte is placed at said bit positions 8–15;

a fourth plurality of buffers disposed in parallel with said RAM bus and said VMEbus for shifting said C and D bytes of said 32 bit word to said bit positions 0–7 and 8–15 respectively;

control register means responsive to said VMEbus and said CPU for selectively enabling one of said first, second, third and fourth pluralities of buffers at a time.

* * * * *